United States Patent Office 3,608,411
Patented Sept. 28, 1971

3,608,411
LENGTH CONTROL METHOD AND APPARATUS
Robert W. Schmidt, 5744 W. 77th St.,
Oak Lawn, Ill. 60459
Filed Aug. 20, 1969, Ser. No. 851,582
Int. Cl. B23d 25/02
U.S. Cl. 83—38                              12 Claims

ABSTRACT OF THE DISCLOSURE

A method and apparatus for automatically and accurately controlling the length of cuts made on a continously running strip of feed stock. A comparison circuit receives information on the length of cut being made by a blade device, compares this with a pre-set length value, and produces an error signal if any length correction is required. The error signal actuates an adjusting motor to operate in the required direction and vary the speed ratio of a transmission through an adjusting mechanism to adjust the timed relationship of blade cut with respect to material feed rate. The adjusting motor is stopped when the length of cut is varied the required amount by a circuit which follows the non-linear curve of length of cut as a function of adjusting mechanism operation.

SUMMARY OF THE INVENTION

This invention relates generally to a method and apparatus for automatically controlling the length of cut of a strip of feed stock and more particularly relates to a method and apparatus for controlling length of cut made by a cutting device actuated by a variable ratio transmission having non-linear between the adjustment and the resultant ratio change characteristics.

This invention would be used with machines which cut sheets of material from strips of feed stock, such as corrugated board and the like. The cutting mechanism must continually control the length of cut within close tolerances during a production run and also accurately vary the length of cut when it is desired to change the board length for an order changeover. Conventional cutting mechanisms of this type include a blade device which operates in timed relationship to the rate of material input and is actuated by a variable ratio transmission operated from a line shaft driving the input. A typical variable ratio transmission is of the type manufactured by the Reeves Pulley Company and includes two pairs of spaced cones with a belt transmitting power between the driver and driven cones. Axial spacing between the cones in each pair is varied in a manner to reduce or increase the ratio of input to output, as is well-known. Ratio change may be controlled by an adjusting screw mechanism. Because the transmission ratio change characteristics define a hyperbolic curve when plotting the length of cut as a function of adjusting screw rotation, it has heretofore been difficult to easily and accurately control length of cut within predetermined limits, or to change to a new length of cut when a different board length order is received.

In corrugated board production, continuous length control is necessary because the length of the material produced for each revolution of the line shaft may be reduced by excessive tightening of the brakes used to adjust sheet tension as it unwinds to enter the corrugating section.

Present practice is to control length of cut by measuring cut sheet length, comparing this length with the desired length, and jogging the adjusting motor a small amount in the appropriate direction to correct the error. Jogging involves rotating the adjusting motor for a very short time, again comparing the cut length with the desired length, and again operating the adjusting motor until the cut length is within the desired tolerances. This method of length control introduces additional wear on the adjusting mechanism and requires additional lubrication maintenance.

To control length change between orders when no board is being produced, one conventional method is to drive a length transducer directly from the line shaft to give a simulated length with the blade and line shaft rotating to provide a close approximation of the length during the presetting operation, with final blade adjustments made when actual board production resumes. Another conventional method is to obtain a close approximation of length setting of the transmission during order changeover by setting up a predetermined ratio of the Reeves drive output shaft to input shaft. The Reeves adjusting motor is jogged to the new length. However, it is desirable that length control be obtained with a minimum of jogging.

The foregoing measurement methods used for either order change or production runs at best give one, intermittent measurement for each cut. Since the Reeves adjusting motor runs continuously to change length between orders, an accurate measurement cannot be made unless no adjustment is made during the measurement cycle. Therefore, when the control receives information that the new length has been reached, another measurement during which no length adjustment occurs must be made to determine the true length. In addition, the chances of a measurement indicating that the desired new length has been reached at the moment the measurement is made are minimal. If the new length is greater than the old, the direction of error must be reversed to run the adjusting motor in opposite sense until the length of cut is within the desired tolerance.

Accordingly, it is an object of this invention to provide a method and apparatus for controlling length of cut of a strip of feed material in which a blade device is operated by a variable ratio transmission in timed relationship with material feed rate.

Another object is the control of the length of cut in apparatus of the type described to eliminate frequent jogging of the adjusting motor during both production runs and length order changeover.

Another object is a control method and apparatus having a variable ratio cone belt drive for a cut-off blade device including means for compensating for the non-linear variation in speed ratio as length of cut is varied.

Another object is a control method and apparatus including a blade device operated by a variable ratio transmission in which length of cut is measured and compared with a pre-set length to produce a numerical error signal, in which the error signal actuates an adjusting mechanism to vary ratio of the transmission, and in which control movements of the adjusting mechanism are sensed and analyzed in a circuit to stop the adjusting mechanism according to a predetermined relationship of length of cut as a function of adjusting mechanism control movement.

Another object is a method and apparatus for controlling board length in machinery of the type described in which the length of cut is measured and compared with a pre-set length to produce a numerical error measurement which actuates a blade ratio adjusting knife drive mechanism in a direction dependant on the signal sense, the adjusting mechanism actuates variable ratio transmission means to vary the blade cut with respect to input feed rate, a predetermined number of pulses are generated as a function of adjusting mechanism control movement, a predetermined pulse divisor number is generated as a function of adjusting mechanism position, the magnitude of the error correction is counted in length increments equal to the quotient of the pulses and pulse divisors, and the adjusting mechanism terminates operation when the exact numerical value of the error is counted and the pre-set length of cut is reached.

These and other objects and advantages of the invention will become apparent to those skilled in the art when the following specification is read in conjunction with the accompanying drawings wherein.

DETAILED DESCRIPTION

Figure 1:
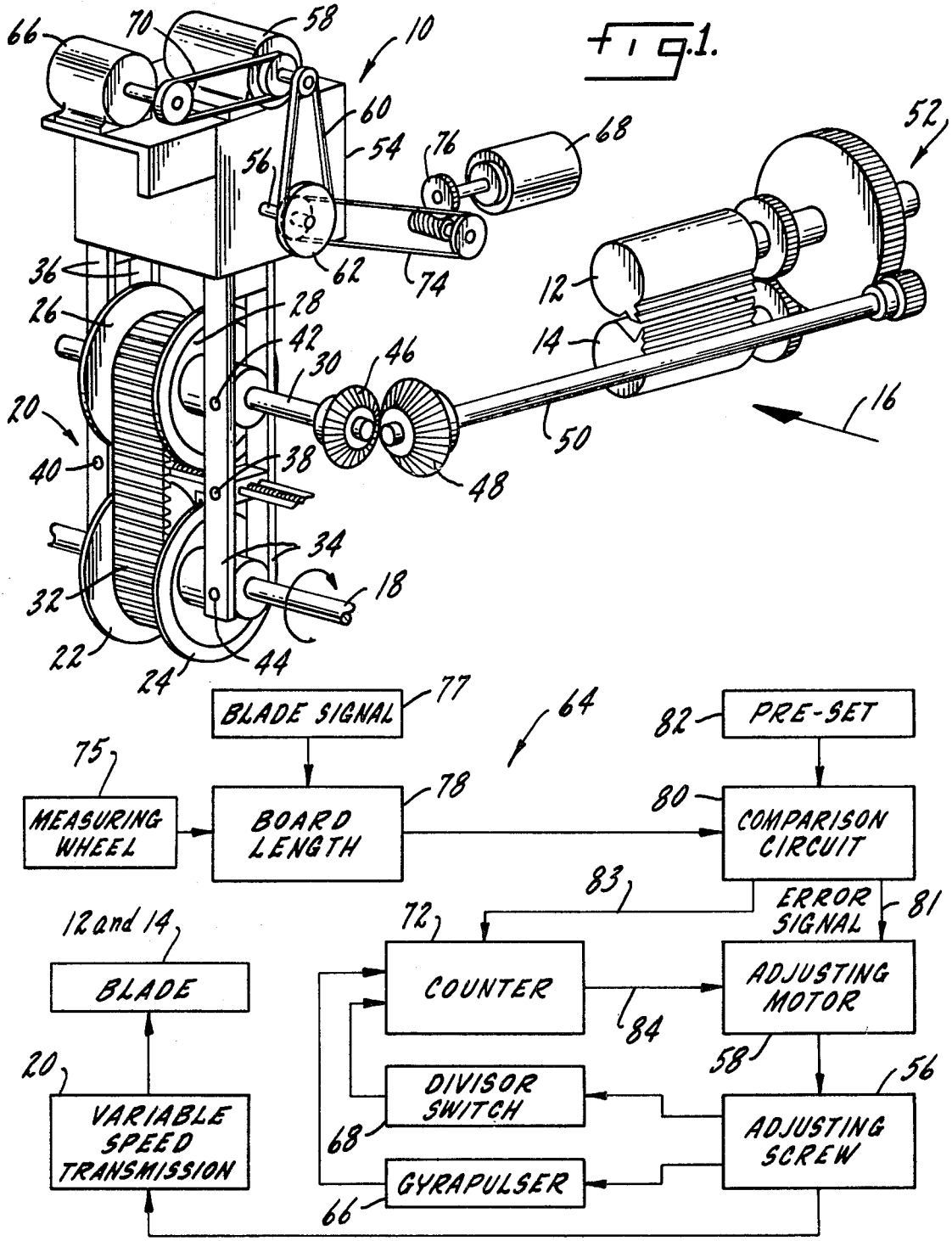
FIG. 1 is a perspective view of portions of a cutting mechanism incorporating features of the invention.

Referring to the drawings and particularly FIG. 1 portions of an apparatus for cutting a continuously running strip of feed stock into predetermined lengths is indicated generally at 10.

Apparatus 10 includes a suitable cutting device, preferably shown as a pair of counter-rotating blades 12, 14 mounted on suitable bearings, not shown, above and below the path of flow of feed material, indicated at 16. The feed material may comprise any type of sheet material, and in the preferred embodiment would be corrugated board directed between the blades from a corrugating machine, not shown. The input feed rate of the material between the blades may be regulated by suitable conveyor means, not shown, driven in proportion to the speed of line shaft 18 by suitable gearing. The sheets of cut material may be conveyed away from the cutting apparatus for subsequent handling or stacking operations.

The length of cut of the feed material is a function of blade rotation and input feed rate at 16. Length of cut preferably is varied by means of variable ratio transmission 20 which drives the blades from line shaft 18. A change in ratio of transmission 20 will increase or decrease length of cut since the rate of material flow between the blades is proportional to line shaft 18 speed.

Variable ratio transmission 20 is illustrated preferably as a cone belt drive type, as for example that which is manufactured by the Reeves Pulley Company, although other variable ratio transmission devices could be utilized in this invention. Transmission 20 comprises two pairs of spaced cone pulleys including drive pulleys 22, 24 splined on line shaft 18 and driven pulleys 26, 28 splined on output shaft 30. An endless belt 32 is mounted between the two pairs of cone pulleys. The cone pulleys are mounted on their respective shafts for conjoint axial sliding movement to vary output speed ratio. Pairs of actuating levers 34, 36 are mounted on fixed pivots 38, 40 with opposite cone pulleys pivotally mounted thereto, as at 42 and 44 for pulleys 28 and 24. Output shaft 30 is connected through bevel gearing 46, 48 to countershaft 50 and suitable gearing 52 to turn blades 12 and 14 for counter-rotation.

A suitable adjusting mechanism 54 is provided to operate levers 34, 36 and adjust the transmission speed ratio. Adjusting screw 56 is connected by conventional means in mechanism 54 to pivot the operating arms about their fixed pivot points. As output cone pulleys 26, 28 are brought closer together drive pulleys 22, 24 will simultaneously separate so that the belt contacts the output cones at a larger diameter and the drive cones at a smaller diameter, thus decreasing the ratio of output to input rotation to increase cut length. Conversely, rotation of adjusting screw 56 in an opposite sense will operate arms 34 and 36 to decrease the spacing between the output pulleys and separate the drive pulleys, thus increasing the ratio of output to input rotation to decrease cut length.

Adjustment screw 56 may be controlled by suitable means such as adjusting motor 58, drive chain or belt 60, and driven pulley 62.

Figure 2:
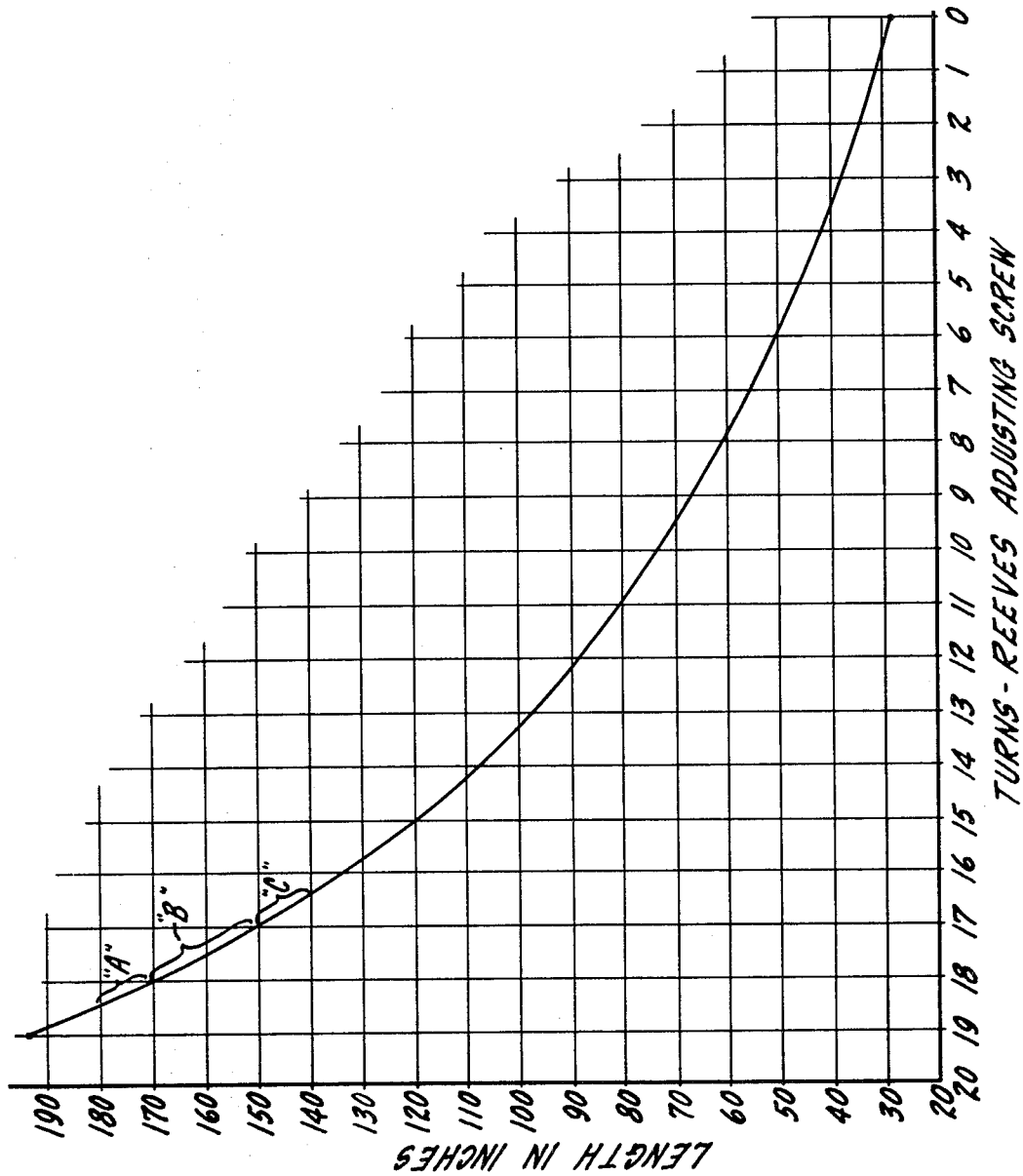
FIG. 2 is a graph plotting length of cut as a function of adjusting mechanism control movement for the invention; and, FIG. 3 is a schematic diagram of the control circuit for the invention.

It is characteristic of the type of variable speed transmission described that for a given input adjustment of screw 56 the ratio change will be non-linear. Referring to FIG. 2 it is seen that the plot of length of cut as a function of number of turns of the adjusting screw defines a hyperbolic curve. A given rotation of the adjusting screw at long lengths on the upper part of the curve will result in six to eight times the length change that the same rotation of the screw has for the shortest lengths. As a result it has heretofore not been possible to accurately control the effect of rotation of the adjusting screw on the change in board length.

Referring to FIG. 3, applicant provides control circuit 64 for operating variable speed transmission 20 to accurately control length of cut both during continuous production runs and for order changeover. Control circuit 64 provides automatic sensing of board length to determine if correction is required, and senses the operative position of the adjusting screw so that proper adjustment can be made for length correction regardless of the position on the curve of FIG. 2.

Control circuit 64 includes a conventional pulse generator 66, preferably of the type known as a gyrapulser, and divisor switch 68, both arranged to operate in relationship to control movements of adjusting mechanism 54.

Gyrapulser 66 is driven by suitable means to produce a predetermined number of pulses for each revolution of adjusting screw 56. As illustrated in FIG. 1 the drive means may include a suitable drive chain or belt 70 driven from the output shaft of adjusting motor 58. In the preferred embodiment the number of pulses generated is 1000 per adjusting screw revolution, although this could be varied in accordance with design considerations of a particular application.

Divisor switch 68 operates to generate pulse divisors or factors in binary output form for use in counter circuit 72. Divisor switch 68 is conventional and comprises a rotary switch having 60 positions within 360° of rotation, each such position operative to open or close ten contacts. The contacts are connected in circuit in a predetermined binary program. The switch is preset so that the binary number or signal produced at each switch position will vary in accordance with a predetermined program of pulse divisors varying in magnitude from 4 to 28 in the preferred embodiment, as the board lengths go from longest to shortest. The divisor switch is connected to follow the rotation of adjusting screw 56 so that for each position of the adjusting screw a predetermined pulse divisor number will be generated in binary form for use in counter circuit 72. Preferably, the divisor switch is connected with the adjusting screw by drive chain or belt 74, and worm gear mechanism 76 having a 20–1 reduction ratio. In the preferred embodiment illustrated, an overall change in length of cut between approximately 28 and 193 inches will require adjusting screw 56 to turn through 20 complete turns. At the same time, divisor switch 68 will make approximately one complete turn and serially generate its programmed pulse divisors into counter circuit 72 dependent on the position of the adjusting screw.

At the same time that the adjusting screw is turning, the gyrapulser 66 is generating a constant number of pulses per screw revolution, 1000 p./rev. in the preferred embodiment. From the graph of FIG. 2 it is seen that to change the length of cut from 180 inches to 170 inches it is necessary to follow curve segment "A" and that this adjustment requires 0.4 turn of the adjusting screw. As the screw turns through this amount 400 pulses will be generated. This means that the magnitude of the pulse divisor at this point on the curve will be 4 to give a quotient of 100. This quotient represents one hundred 0.1 inch increments of change which must be counted for the ten inches of adjustment. The quotient remains the same along the curve because the divisor changes with the changing slope of the adjustment curve so that the 0.1 inch increments can be counted by counter circuit 72 as the adjusting screw operates. When the 100 increments are counted, the control circuit will automatically terminate operation of the adjusting screw for a 10-inch length change.

If it is required to change the length from 170 to 150 inches then in following the curve along segment "B" the adjusting screw takes slightly more than one turn. The divisor switch is programmed at this segment for a pulse divisor of 5 so that for the first 500 pulses as generated by gyrapulser 66 the actual board length will be 160.2 inches, and the second 500 pulses will bring the length to 150.25 inches.

To next change the length of cut to 140 inches it is apparent from the graph that the control circuit must follow segment "C" and that this requires a pulse divisor of 6 programmed into the divisor switch. As the adjusting motor operates to turn the adjusting screw, 600 pulses will be generated by gyrapulser 66 and divided by the pulse divisor of 6 so that one hundred 0.1 inch increments are counted in counter 72, which then operates to shut off the adjusting motor 58. The actual length of cut resulting from such an adjustment will be about 140.2 inches, or an error of 0.2 inch. This error is acceptable and is not cumulative over a series of adjustments. In one actual embodiment changes of length of 100 inches were made with length errors of only 0.1 inch.

Other pulse divisors required to follow the particular curve illustrated are as follows:

| Board length inches: | Pulse divisor |
|---|---|
| Between 40 and 50 | 24 |
| Between 50 and 60 | 20 |
| Between 60 and 70 | 17 |
| Between 70 and 80 | 14 |
| Between 80 and 90 | 13 |
| Between 90 and 110 | 11 |
| Between 110 and 120 | 9 |
| Between 120 and 140 | 7 |

Where different change speed transmissions are utilized, the pulse divisors could be varied as required to match the particular curve characteristics of such variable ratio transmission.

The number of pulses produced in the preferred embodiment is 1000 p./rev. so that the pulse dividers will produce length change increments of 0.1 inch. Where it is desirable to have increments of 0.05 inch the same pulse divisor numbers can be utilized with gyrapulser 66 set to generate 2000 pulses for each revolution of the adjusting screw.

The number of pulses produced by the gyrapulser is not critical as long as the divisor number is not less than 4 so that a change in the divisor of 1 digit does not greatly alter the slope made in following the curve of FIG. 2. Otherwise, as for example if the divisor changed from 2 to 3, it would require too large a change of slope and there would be too great a departure from the actual hyperbolic curve with the result that objectionable errors in change of length would occur.

Length of cut of the infeed stock can be measured by any suitable means and preferably this is done by measuring the rate of material flow, as by a conventional measuring wheel mechanism 75. This is integrated with the exact time of blade cut from blade signal 77 to produce either an analog or digital value representing board length in a conventional integrating circuit 78. This board length is entered into a conventional comparison circuit 80 where it is compared with the desired board length value received from pre-set control 82.

Where an error between actual board length and the desired length occurs, such as may result during a production run or from order changeover when the pre-set is changed, circuit 80 will produce a numerical measurement of the error at 81 of the direction sense required to bring the length of cut to the desired length. The error signal actuates adjusting motor 58 to turn adjusting screw 56 in the required direction to reduce the error to zero. At the same time the exact magnitude of the error is shifted at 83 into counter 72. Preferably, the error signal magnitude is entered into the counter in 0.1 inch increments and as the control is actuated it begins to count down from the total number of error increments received from comparison circuit 80. Each 0.1 inch increment is counted off as it is received as a quotient from the pulses of gyrapulser 66 as divided by the pulse divisor of switch 68. When the total number of increments are counted equaling the magnitude of the error signal, counter 72 directs a signal 84 to terminate operation of adjusting motor 58, which in turn stops adjusting screw 56 so that transmission 20 is in the correct ratio for producing the desired length of cut.

For an order changeover to produce board length of different dimensions the new length would be fed into preset 82. This could take place during a continuous production run without any downtime. Comparison circuit 80 would immediately sense the numerical error between the new length and the old board length measured at 78, thus producing an error signal, either short or long, for operating the circuit in the manner described to adjust the speed ratio of transmission 20.

It is understood that the specific ratios, length of cut dimensions, magnitudes of the pulse divisors, number of pulses per screw revolution, number of adjusting turns of the adjusting mechanism and the like are given by way of example only and can be varied to meet particular design configurations and operating conditions.

I claim:

1. A control circuit for regulating the length of cut made by blade means in a moving sheet of feed material with means varying the length of cut by varying cutting of the blade means in predetermined timed relationship with input material feed rate including the combination of: means sensing the length of cut to produce a first signal equal thereto; comparison circuit means to compare the first signal with a predetermined desired length of cut, said comparison circuit producing a numerical error signal when the first signal differs from the predetermined length; means to adjust the length of cut varying means responsive to the error signal, said adjusting means operating to vary the length of cut to said predetermined desired length; and, means to terminate operation of the adjusting means when said predetermined numerical error signal is corrected, said terminating means including programmed means sensing actuation of said adjusting means and numerical measurement of the error signal for producing change in length with respect to the operative position of said length of cut varying means according to said predetermined relationship.

2. The invention of claim 1 wherein the length of cut varying means includes a variable ratio transmission driving said blade means in predetermined relation to said input feed rate, said adjusting means includes an adjusting member operable to vary said ratio whereby the change in length of cut varies as a non-linear function of operation of said adjusting member, and said terminating means is effective to terminate operation of the adjusting means so that the change in length of cut to said predetermined length follows said non-linear function.

3. The invention of claim 1 wherein the terminating means includes pulse means generating a predetermined number of pulses responsive to a predetermined magnitude of adjustment of said adjusting means, means to produce pulse divisor signals of a magnitude varying in predetermined relationship to operation of said adjusting means, and means to count length of change increments in units which are the quotient of said pulses and said pulse divisor signals, said counter means operating to terminate operation of the adjusting means when the number of increments counted equals the magnitude of said error signal.

4. The invention of claim 1 wherein the length of cut varying means comprises a variable ratio transmission having a pair of axial slidable driver cones rotating in timed relationship with the input feed rate, a pair of axially slidable driven cones operatively connected with the blade means, an endless belt trained between said pairs of cones, and an adjusting mechanism operatively connecting said pairs of cones for conjoint sliding movement to vary said speed ratio whereby said length of cut is varied in accordance with operation of the adjusting linkage as a predetermined function of length of cut.

5. The invention of claim 4 wherein the adjusting means includes an adjusting motor operatively connected with said adjusting mechanism, said numerical error signal is effective to initiate operation of said adjusting motor, and said terminating means is effective to terminate operation of said adjusting motor when said predetermined length of cut is reached.

6. The invention of claim 5 wherein said terminating means further includes means to generate a predetermined number of pulses responsive to a predetermined movement of said adjusting mechanism, means to produce a plurality of pulse divisors having a magnitude of predetermined value in relation to adjusting mechanism position whereby the quotient of said pulses and pulse divisors equals predetermined length of change increments for terminating operation of said adjusting motor when said predetermined length of cut is reached.

7. The invention of claim 6 wherein said terminating means further includes means to count said increments, and means to terminate operation of said adjusting motor when the number of increments counted equals the magnitude of said error signal.

8. The method of controlling the length of cut made in a strip of feed material by blade means driven by variable ratio change means in timed relationship with material feed rate comprising the steps of: measuring the length of cut made by the blade means, comparing said length of cut with a pre-set length of cut, producing an error signal having a magnitude equal to the difference between said measured length of cut and said pre-set length, initiating adjustment of said blade means to vary said length of cut and reduce said error signal, counting the magnitude of said error signal in length of change increments having a value which is a predetermined function of said adjustment, and terminating said adjustment when the number of increments counted equals the numerical magnitude of said error.

9. The method of claim 8 wherein the adjustment step includes operating an adjusting member to vary operation of said blade means as a function of input feed, and further including the steps of: generating a predetermined number of pulses for a predetermined movement of said adjusting member, generating a plurality of pulse divisors having a magnitude varying in accordance with a predetermined function of movement of the adjusting member, counting length of change increments equal to the quotient of said pulses and said pulse divisors, and terminating operation of said adjusting member when said number of increments counted equals said error signal.

10. The method of controlling the length of cut made in a strip of material by blade means driven by variable ratio transmission means in timed relationship with material feed in which operation of adjusting means to vary the ratio and therefore the length of cut is a non-linear function of the length of cut, including the steps of: measuring the length of cut made by the blade means, comparing said length of cut with a predetermined length, producing an error signal equal to the difference between the measured length and said predetermined length, initiating operation of said adjusting means responsive to the error signal to vary the ratio of said transmission for changing said length of cut to reduce said error signal, counting length of change increments having a magnitude which is a predetermined function of transmission ratio, and terminating operation of said adjusting means when the total of the increments counted equals the magnitude of said error signal.

11. The method of claim 10 and further including the steps of generating a predetermined number of pulses as a function of operation of said adjusting means, generating a plurality of pulse divisors having a magnitude which is a predetermined function of transmission ratio, and counting said increments with magnitudes equal to the quotient of said pulses and said pulse divisors.

12. The method of claim 11 wherein the variable speed transmission comprises a cone belt drive having a speed ratio which varies as a hyperbolic function of movement of said adjusting means, and further characterized in that: the magnitude of said pulse divisors is not less than four whereby the increments counted follow a predicted curve closely approximating said hyperbolic function.

References Cited

UNITED STATES PATENTS

| | | | |
|---|---|---|---|
| 3,244,863 | 4/1966 | Peterson | 83—76X |
| 3,267,781 | 8/1966 | Sterns et al. | 83—76X |
| 3,324,751 | 6/1967 | Rubinstein et al. | 83—73 |
| 3,355,973 | 12/1967 | Rubinstein et al. | 83—76 |
| 3,411,388 | 11/1968 | Rappaport | 83—76 |

WILLIAM S. LAWSON, Primary Examiner

U.S. Cl. X.R.

83—76, 311